(12) United States Patent
Norton

(10) Patent No.: US 10,489,614 B2
(45) Date of Patent: Nov. 26, 2019

(54) TAMPER DETECTING CASES

(71) Applicant: Hewlett Packard Enterprise Development LP, Houston, TX (US)

(72) Inventor: John Norton, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 122 days.

(21) Appl. No.: 15/715,950

(22) Filed: Sep. 26, 2017

(65) Prior Publication Data

US 2019/0095656 A1    Mar. 28, 2019

(51) Int. Cl.
| | | |
|---|---|---|
| *G06F 21/00* | (2013.01) | |
| *G06F 21/86* | (2013.01) | |
| *G06F 21/60* | (2013.01) | |
| *G06F 1/18* | (2006.01) | |
| *H05K 5/02* | (2006.01) | |
| *G11C 7/24* | (2006.01) | |
| *G11C 7/10* | (2006.01) | |
| *H05K 5/03* | (2006.01) | |
| *G11C 5/14* | (2006.01) | |

(52) U.S. Cl.
CPC ............ *G06F 21/86* (2013.01); *G06F 1/182* (2013.01); *G06F 21/60* (2013.01); *G11C 7/24* (2013.01); *H05K 5/0208* (2013.01); *G06F 2221/2143* (2013.01); *G11C 5/148* (2013.01); *G11C 7/1006* (2013.01); *H05K 5/03* (2013.01)

(58) Field of Classification Search
None
See application file for complete search history.

(56) References Cited

U.S. PATENT DOCUMENTS

| 4,674,652 | A | * | 6/1987 | Aten | A61J 7/04 |
| | | | | | 221/15 |
| 4,811,288 | A | | 3/1989 | Kleijne et al. | |
| 5,117,457 | A | * | 5/1992 | Comerford | G06F 21/87 |
| | | | | | 340/652 |
| 6,292,898 | B1 | * | 9/2001 | Sutherland | G06F 21/87 |
| | | | | | 713/193 |

(Continued)

FOREIGN PATENT DOCUMENTS

WO    WO-2001063994 A2    8/2001

OTHER PUBLICATIONS

Grand, J.; "Introduction to Embedded Security"; 2004; 63 pages.

*Primary Examiner* — Maung T Lwin
(74) *Attorney, Agent, or Firm* — Hewlett Packard Enterprise Patent Department

(57) ABSTRACT

Examples relate to tamper detecting cases comprising a socket and a mating lid. The socket has a bottom wall, opposing side walls and an upper opening and the mating lid has a top wall, opposing side walls and a lower opening. The socket and the mating lid fit together defining an inner cavity to store a storage unit. The tamper detecting case further comprises a three dimensional grid of conductive traces formed on the opposing side walls of the socket, an inner surface of the bottom wall of the socket and on an inner surface of the top wall of the mating lid, that forms a current path. The tamper detecting case also comprises a sensor that is to sense a flow of electrical current flowing through the current path and to generate a signal to erase the storage unit when the current path is interrupted.

17 Claims, 4 Drawing Sheets

(56) References Cited

U.S. PATENT DOCUMENTS

| | | |
|---|---|---|
| 7,167,092 B2 | 1/2007 | Higashiyama et al. |
| 7,468,664 B2 | 12/2008 | Daughton et al. |
| 7,945,792 B2 | 5/2011 | Cherpantier |
| 2010/0169671 A1* | 7/2010 | Coussieu ............... G06F 21/75 713/193 |
| 2014/0230079 A1* | 8/2014 | Alam ..................... G06F 21/78 726/34 |
| 2017/0116830 A1 | 4/2017 | Isaacs |

* cited by examiner

TAMPER DETECTING CASES

BACKGROUND

Tamper-resistant electronic devices are used to store and process sensitive information, such as encryption keys, electronic money credit and private data. To prevent an attacker from retrieving or modifying the stored information, the electronic devices, e.g., storage devices such as memories, are designed so that the information is not accessible through external means and can be accessed only by embedded software, which should contain the appropriate security measures. Tamper-resistant electronic devices may be designed to erase their sensitive data, for example cryptographic keys, if they detect penetration of their security encapsulation or out-of-specification environmental parameters.

DETAILED DESCRIPTION

Figure 1:
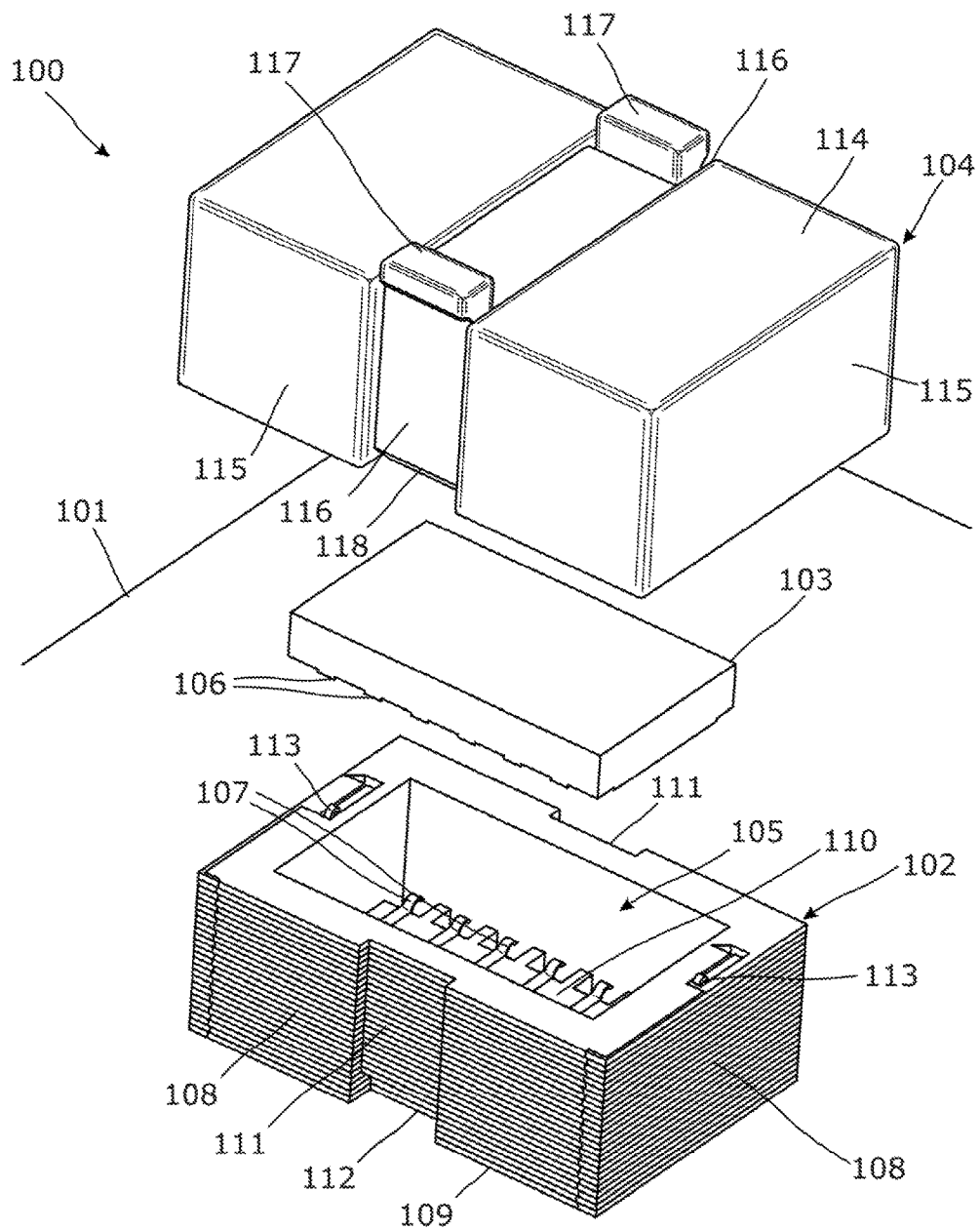
FIG. 1 is an exploded view of an example tamper detecting case for protecting a storage unit.

Security chips including storage units, such as volatile or non-volatile memories, that store sensitive, confidential and critical information for an electronic system may be vulnerable to attacks on the physical structure of the chips. In particular, attackers may seek to modify circuits in order to obtain information stored in the chip, and more particularly stored in the storage units of the chip, and/or to change the operating characteristics of the chips to characteristics useful to the attacker. Interconnection tracks and other circuit elements of the chip can be interrogated, or have signals injected. These circuit elements may also be rerouted, disabled or crippled. The security chips may receive many other possible attacks relying on physical modification, e.g. microprobing, drills, files, solvents, etc.

Passive shields may be used to protect the security chips from attacks. Passive shields are typically effective in preventing viewing of the circuit and making attacks more time-consuming. The passive shields are often made from the upper layer of metal interconnects in a multi-layer circuit. However, breaches in these passive shields may not be detected. Active shields may detect breaches and disable the security chip. However, although circumventing an active shield is significantly more difficult and time-consuming and is generally limited to a small number of small select areas of the chip under attack, is also possible.

Nowadays, higher levels of physical security, such as Federal Information Processing Standard (FIPS) 2&3, tamper response and/or tamper detection of the security circuitry for the sensitive components, e.g. storage units storing critical data, in electronic systems, such as computers, servers, phones, etc., is required. In some systems, implementing system level tamper response or detection may be impractical and component level implementations may be necessary. Also, installing and configuring secure systems in general purpose supply chains and factories can run afoul requirements in certain industries, such as banking covered by TR-139 that is a well-known regulation standard for the banking industry.

Besides, erasing non-volatile storage units can require active erasure, which is challenging in a power loss state and, when the storage units are tempered with an entire subsystem, requires extensive available backup energy. Besides, an accidental erasure of an storage unit due to not following proper security protocols may require the replacement of an entire PCB with all the components attached to the PCB and not only the storage unit. Supply chain security burden may also require expensive solution such as using dedicated manufacturing lines in different facilities.

To address these issues, examples disclosed herein describe tamper detecting cases that may comprise a socket and a mating lid that may fit together defining an inner cavity to host a storage unit. The socket may have a bottom wall, opposing side walls and an upper opening. The number of opposing side walls may depend on the storage device to be hosted within the socket, for example the socket may have two pairs of opposing side walls to host a square-shaped or rectangular-shaped storage device. The mating lid may have a top wall, opposing side walls and a lower opening. The number and arrangement of the opposing sides of the matting lid may correspond to the number and arrangement of the opposing side walls of the socket. The storage unit may comprise a single storage component or a plurality of interconnected storage components. The storage components may be selected from a group comprising Memristors, reRAMs, MRAMs, flash memories, SRAMs, DRAMs and any combination thereof.

The tamper detecting cases may further comprise a three dimensional grid of conductive traces formed on the opposing side walls of the socket, an inner surface of the bottom wall of the socket and on an inner surface of the top wall of the mating lid. The three dimensional grid of conductive traces may form, when the socket and the mating lid are attached to each other, a current path, such that the 3D grid of conductive traces, and thus the current path, completely surround the socketed storage unit. This current path may be continuously powered by, for example, an external power unit of the electronic system in which the tamper detecting case is installed. In some examples the 3D grid may be formed on the inner surface of the opposing side walls of the socket or the outer surface of the opposing side walls. In some other examples, the 3D grid may be formed on the inner surface and the outer surface of the opposing side walls of the socket to reinforce security.

The tamper detecting case may also comprise a sensor that is to sense a flow of electrical current flowing through the current path, wherein the sensor may be to generate a signal that erases the storage unit, when the current path is interrupted. In some examples the sensor may be located within the cavity defined by the socket and the lid and therefore, it is a socketed component that is protected from external attackers. The sensor may be integrated in a security chip such as a security application-specific integrated circuit (ASIC).

In some examples, the current path may be interrupted due to an unauthorized opening of the mating lid, an unauthorized pierce of the 3D grid, for example by drilling the tamper detecting case, or due to a power loss. The distance between two contiguous sections of the conductive traces of the 3D grid is small enough to ensure that any drilling in the tamper detecting case may break the 3D grid interrupting the current path and thus, triggering the erasure of the storage unit.

In some examples, the tamper detecting cases may comprise a host base management controller to erase the storage unit in response to receiving the signal from the sensor. This host base management controller may be integrated into the security chip with the sensor or on a different security chip and may be located within the cavity of the tamper detecting case or may be external. In such examples, the storage unit may be a non-volatile storage and the host base management controller may generate a power signal to erase the sensitive information stored in the non-volatile storage unit. The power signal generated by the host base management controller may have a power level that exceeds an integrity limit threshold value of the non-volatile storage unit, irreversibly damaging the memory cells of the non-volatile storage unit. By burning the memory cells of the non-volatile storage unit out, the sensitive information stored therein is erased. The power signal generated by the host base management controller may come from a power supply external to the tamper detecting case or from a capacitive cell, previously powered by the power supply, that may be located together with the host base management controller in the security chip.

In some other examples, the host base management controller, instead of generating a power signal, may generate a zeroizing request signal to cause the non-volatile storage unit to zeroize in response to receiving the signal from the sensor. This zeroizing request signal may cause the non-volatile storage unit to zeroize the memory cells storing the sensitive information. In such example, the non-volatile storage unit, in order to zeroize the memory cells, may receive power from the power unit or, in case of power loss, from the capacitive cell.

In some other examples, the storage unit hosted within the tamper detecting case may be a volatile storage unit and the host base management controller may comprise a switch. The switch, in response to receiving the signal from the sensor, may open interrupting the power supply from the power unit or the capacitive cell to the volatile storage unit to erase the sensitive information stored in the volatile storage unit. The capacitive cell that may be located together with the host case management controller may also power the volatile storage unit in response to detecting a power loss.

In some examples, the dimensions of the matting lid are such that, when the socket and the mating lid are joined together, the mating lid completely covers the socket and the opposing side walls of the mating lid completely cover the opposing side walls of the socket, completely hiding the 3D grid of conductive traces from outside. In this way, the lid completely covers the 3D grid of conductive traces even when the conductive traces are formed on the outer surface of the socket. Thus, any unauthorized access to the storage unit hosted within the tamper detecting case that may, for example, attempt to drill the case in any of its external faces, may pierce the 3D grid triggering the erasure of the storage unit hosted within the case.

In the following description, for purposes of explanation, numerous specific details are set forth in order to provide a thorough understanding of the present systems and methods. It will be apparent, however, to one skilled in the art that the present apparatus and systems may be practiced without these specific details. Reference in the specification to "an example" or similar language means that a particular feature, structure, or characteristic described in connection with that example is included as described, but may not be included in other examples.

Turning now to the figures, FIG. 1 shows an exploded view of an example tamper detecting case 100 for protecting a storage unit. It should be understood that the example tamper detecting case 100 depicted in FIG. 1 may include additional components and that some of the components described herein may be removed and/or modified without departing from a scope of the example tamper detecting case 100.

The tamper detecting case 100 is attached to a PCB 101 and may be interconnected to other electric and electronic devices of the PCB, e.g. memories, processors, power units, controllers, etc. (not shown in the figure). The tamper detecting case 100 comprises a socket 102 and a mating lid 104 that define a cavity 105 in which a storage unit, e.g. a memory, is hosted and serviced. The storage unit 103 is a rectangular shaped storage unit that fits within the cavity 105 and may comprise a single memory or a plurality of interconnected memories, such as memristors, reRAMs, MRAMs, flash memories, SRAMs, DRAMs, etc. The socket 102 is a rectangular-shaped socket and has a bottom wall 109, two pairs of opposing side walls 108 and an upper opening. In turn, the mating lid 104 is a rectangular-shaped mating lid and has a top wall 114, two pairs of corresponding opposing side walls 115 and a lower opening.

The lower surface of the storage unit 103 comprises electrical connectors 106 that contact to electrical connectors 107 located in the inner surface 110 of the bottom wall 109 of the socket 102 when the storage unit 103 is fully inserted into the cavity 105. These electrical connectors 106, 107 are to service the storage unit 103 (e.g., powering and data transmission between the PCB 101 and the storage unit 103) and any other components within the cavity 105.

Each of the side walls of the pair of opposing side walls 108 of the socket 102 having greater length comprises a recess 111 to accommodate respective pivoting arms 116 of the mating lid 104. These pivoting arms 116 are located in the corresponding side walls of the opposing side walls 115 of the mating lid 104 having greater length. Each pivoting arm 116 comprises a tab 117 at its upper edge and a hook-shaped protrusion 118 at the opposite lower edge. The mating lid 104 is attached to the socket 102 by pushing the mating lid 104 against the socket 104 until the upper edge of the socket 102 abuts against the inner surface of the upper wall 114 of the mating lid 104. During the attaching operation, the pivoting arms 116 are guided through the recesses 111 until the hook-shaped protrusions 118 are inserted into respective grooves 112 of the socket 102. Once the socket 102 and the mating lid 104 are attached to each other, the tabs 117 can be inwardly pressed releasing the hook-shaped protrusions 118 from the grooves 112 to allow removing the mating lid 104 from the socket 102.

The socket 102 further comprises conductive traces in the outer surface of the two pairs of opposing side walls 108 and in the inner surface of the bottom wall 109 (not shown in this figure). These conductive traces form a continuous current path in the socket 102. The socket 102 comprises electrical contacts 113 on the upper edge of the opposing side walls 108 having a smaller length that contact to complementary electrical contacts (not shown in this figure) in the mating lid 104 such that, when the socket 102 and the mating lid 104 are attached to each other, the electrical contacts 113 electrically couples the complementary electrical contacts in the mating lid 104 to form the 3D grid of conductive traces that completely surrounds the cavity 105 including the storage unit 103 and other security or power components that may host.

Figure 2:
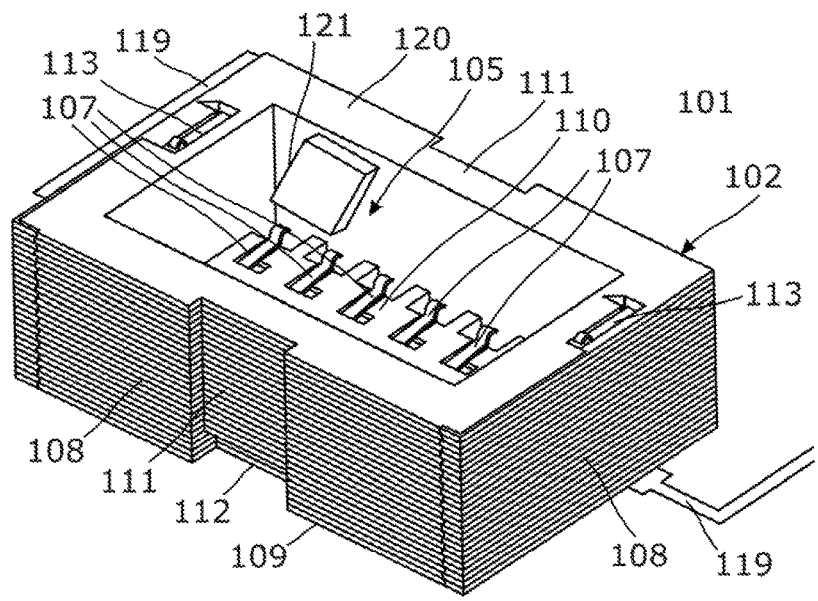
FIG. 2 is a perspective view of the socket of the example tamper detecting case shown in FIG. 1.

FIG. 2 shows a perspective view of the socket 102 of the example tamper detecting case 100 shown in FIG. 1. It should be understood that the example socket 102 depicted in FIG. 2 may include additional components and that some of the components described herein may be removed and/or modified without departing from a scope of the example socket 102.

The rectangular-shaped socket 102 has a bottom wall 109, two pairs of opposing side walls 108 and an upper opening. The socket 102 further comprises conductive traces in the outer surface of the two pairs of opposing side walls 108 and in the inner surface of the bottom wall 109 (not shown in this figure). While FIG. 2 shows the conductive traces in the outer surfaces of the opposing side walls 108, the conductive traces may be formed in the inner surface of the opposing side walls 108 or in both, to increase security. This conductive traces form a continuous current path through which, when the matting lid 104 is fully attached to the socket 102, current from a power source (not shown in this figure) continuously flows. For example, the power source may be powering to the tamper detecting case, including the storage unit 103, the 3D grid of conductive traces, the sensor 121 and any other security or power component hosted within the cavity 105, through the traces 119. The socket 102 comprises electrical contacts 113 in the form of pins on the upper edge 120 of the opposing side walls 108 having a smaller length. These electrical contacts 113 contact to complementary electrical contacts in the matting lid 104 (not shown in this figure) such that, when the socket 102 and the matting lid 104 are attached to each other, the electrical contacts 113 electrically couples the complementary electrical contacts in the matting lid 104 to form the 3D grid of conductive traces that completely surrounds the socketed storage unit 103.

The conductive traces formed on the socket 102 and the matting lid 104 may be formed using a technique selected among a group comprising a Molded Interconnect Device (MID) technique, a Laser Direct Structuring (LDS) technique and a combination thereof. The MID and LDS techniques allow to form traces in a 3D environment by using injection molded plastics that can be soldered, plastic welded, insert molded, over-molded and wire bonded.

The inner surface 110 of the bottom wall 109 of the socket 102 further comprises electrical connectors 107 in the form of pins in correspondence with the electrical connectors 106 of the storage unit 103. These electrical connectors 107 are to service the storage unit 103 (e.g., powering and data transmission between the PCB 101 and the storage unit 103). The sensor 121 that is to, when the matting lid 104 and the socket 102 are attached to each other, sense the flow of electrical current flowing through the current path and to generate a signal to erase the at least one storage unit when the current path is interrupted is attached to one of the inner faces of the opposing side walls 108 of the socket 102. Thus, the sensor 121 continuously monitors the flow of electrical current flowing through the 3D grid of conductive traces and generates a signal to erase the storage unit 103 when the current flow is interrupted. This current flow may be interrupted when the matting lid is removed, the 3D grid of conductive traces is pierced or broken or when a power loss is detected.

Figure 3:
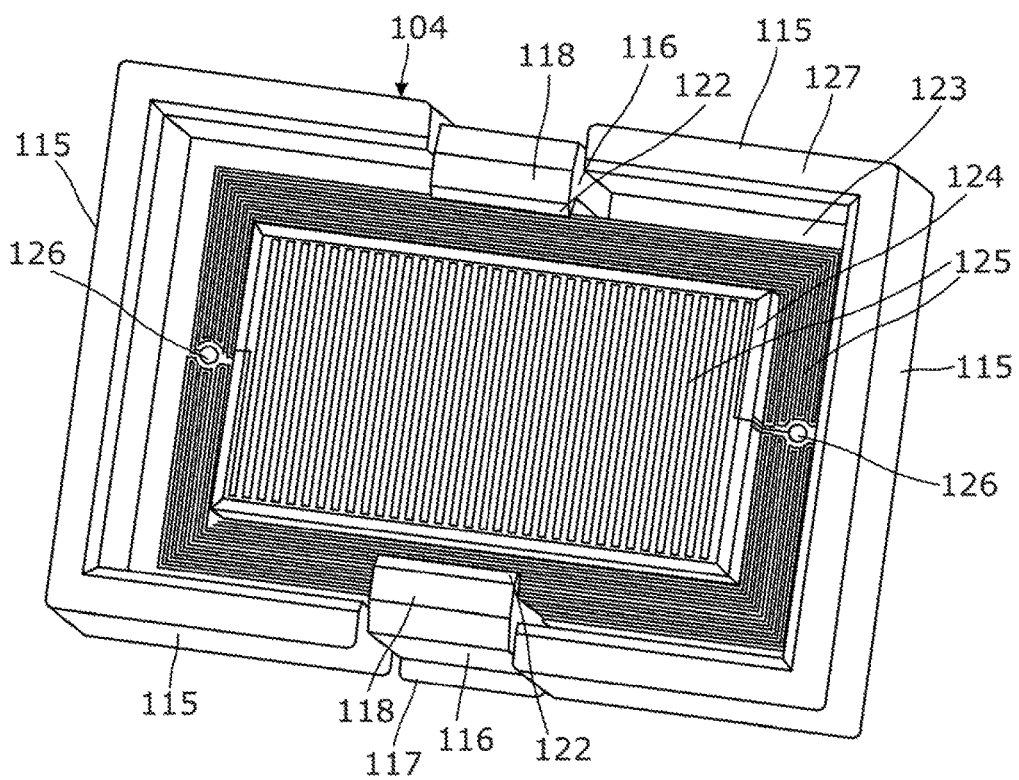
FIG. 3 is a perspective bottom view of the matting lid of the example tamper detecting case shown in FIG. 1.

FIG. 3 is a perspective bottom view of the matting lid 104 of the example tamper detecting case 100 shown in FIG. 1. It should be understood that the example matting lid 104 depicted in FIG. 3 may include additional components and that some of the components described herein may be removed and/or modified without departing from a scope of the example matting lid 104.

The rectangular-shaped mating lid 104 has a top wall 114, two pairs of corresponding opposing side walls 115 and a lower opening. The opposing side walls 115 of the mating lid 104 have a bottom edge 127 that abuts against the PCB 101, when the mating lid 104 is fully attached to the socket 102, avoiding unauthorized accesses to the socket 102. The dimensions of the mating lid 104 are such that, when attached to the socket 102, completely cover the sidewalls of the cover, and more in particular the length of the opposing side walls 115 of the mating lid 104 are such that completely cover the opposing side walls 108 of the socket. In this way, the 3D grid of conductive traces surrounding the socketed storage unit 103 is not externally visible. The mating lid 104 also comprises the two pivoting arms 116 with hook-shaped protrusions 118 to attach the mating lid 104 to the socket 102. The hook-shaped protrusions 118 have respective hook ends 122 to be inserted into the corresponding grooves 112 of the socket 102.

The inner face of the top wall 114 of the mating lid 104 defines a first portion 123 that fits to and abuts against the upper edge 120 of the opposing side walls 108 of the socket 102 and a second portion 124 that fits to the upper opening defined by the opposing side walls 108 of the socket 102. While the second portion 124 is completely covered by conductive traces 125, the first portion 123 comprise conductive traces 125 in the area in direct contact with the upper edge 120 of the socket 102. The conductive traces 125 in the first portion and the second portion are connected to each other forming one single continuous conductive path. The area of the first portion 123 not having conductive traces corresponds to an space between the opposing side walls 108 of the socket 102 and the opposing side walls 115 of the mating lid 104 that avoids damaging the conductive traces in the outer surface of the opposing side walls 108 of the socket 102 during the installation and removal of the mating lid 104. In such example, the thickness of the arms 116 defines the space between the opposing side walls 108 of the socket 102 and the opposing side walls 115 of the mating lid 104.

The area of the first portion 123 having conductive traces 125 comprises electrical contacts 126 in the form of pads located in correspondence with the electrical contacts 113 in the upper edge 120 of the opposing side walls 108 of the socket 102. When the mating lid 104 is fully attached to the socket 102, the electrical contacts 113 of the socket 102 contact the complementary electrical contacts 126 in the matting lid 104 (not shown in this figure) to form the 3D grid of conductive traces that completely surrounds the socketed storage unit 103.

Figure 4:
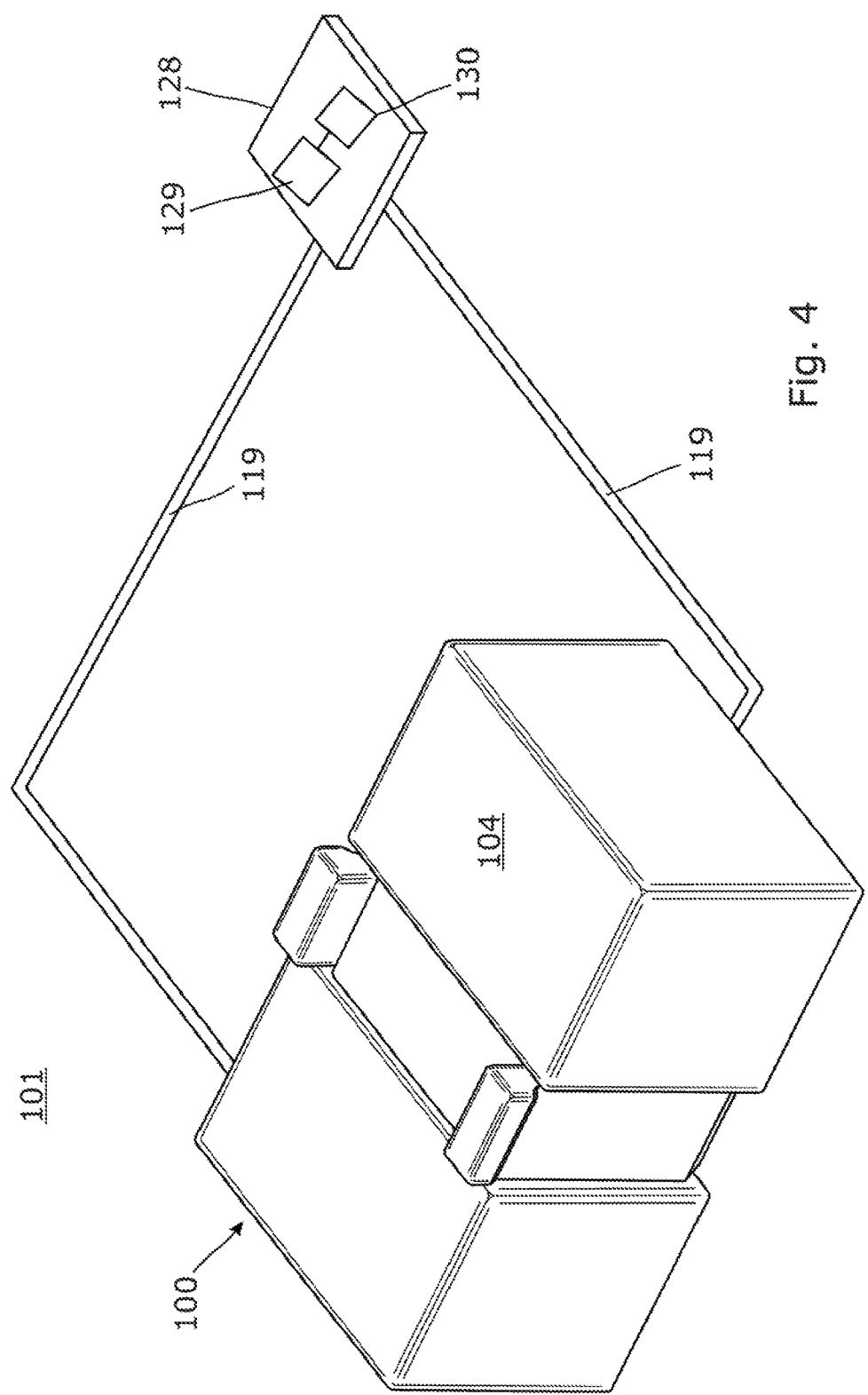
FIG. 4 is a perspective view of the example tamper detecting case of FIG. 1 with the matting lid attached to the socket and including a host base management controller externally connected to the tamper detecting case.

FIG. 4 is a perspective view of the example tamper detecting case 100 of FIG. 1 with the matting lid 104 attached to the socket 102 and including a host base management controller 129 externally connected to the tamper detecting case 100. It should be understood that the example tamper detecting case 100 depicted in FIG. 4 may include additional components and that some of the components described herein may be removed and/or modified without departing from a scope of the example tamper detecting case 100.

While, in FIG. 4 the host base management controller 129 is located in a security chip 128 attached to the PCB 101 and external to the tamper detecting case 100, in some other examples, this security chip 128 may be hosted within the cavity 105 to increase security by avoiding attacks to the host base management controller 129.

The security chip 128 is connected to the tamper detecting case 100 by traces 119 through which the tamper detecting case 100 may be serviced (e.g., powering the 3D grid and powering and data transmission between the PCB 101 and the tamper detecting case 100). The host base management controller 129 is to erase the storage unit 103 within the tamper detecting case 100 in response to receiving the signal from the sensor 121. In such example, the sensor 121 may be stored within the cavity 105 and electrically connected to the host base management controller 129 through the traces 119. In some other examples, the host base management controller 129 and the sensor 121 may be stored in the same security chip within the cavity 105.

The security chip 128 further comprises a capacitive cell 130 to generate the power signal to erase the information in the non-volatile storage unit 103 within the tamper detecting case 100, wherein the power signal has a power level that exceeds an integrity limit threshold value of the non-volatile storage unit 103. In other examples, the host base management controller 129 may generate the power signal by itself or may generate a zeroizing request signal to cause the non-volatile storage unit 103 to zeroize.

In some other examples, when the storage unit 103 is a volatile storage unit, the host base management controller 129 may comprise a switch (not shown in the figure) that, in response to receiving the signal from the sensor 121, opens interrupting the power supply from a power unit (not shown in the figure) connected to the security chip 128 to the volatile storage unit 103 erasing the information stored in the volatile storage unit 103. In such examples, the capacitive cell 130 is to power the volatile storage unit 103 in response to detecting a power loss.

Figure 5:
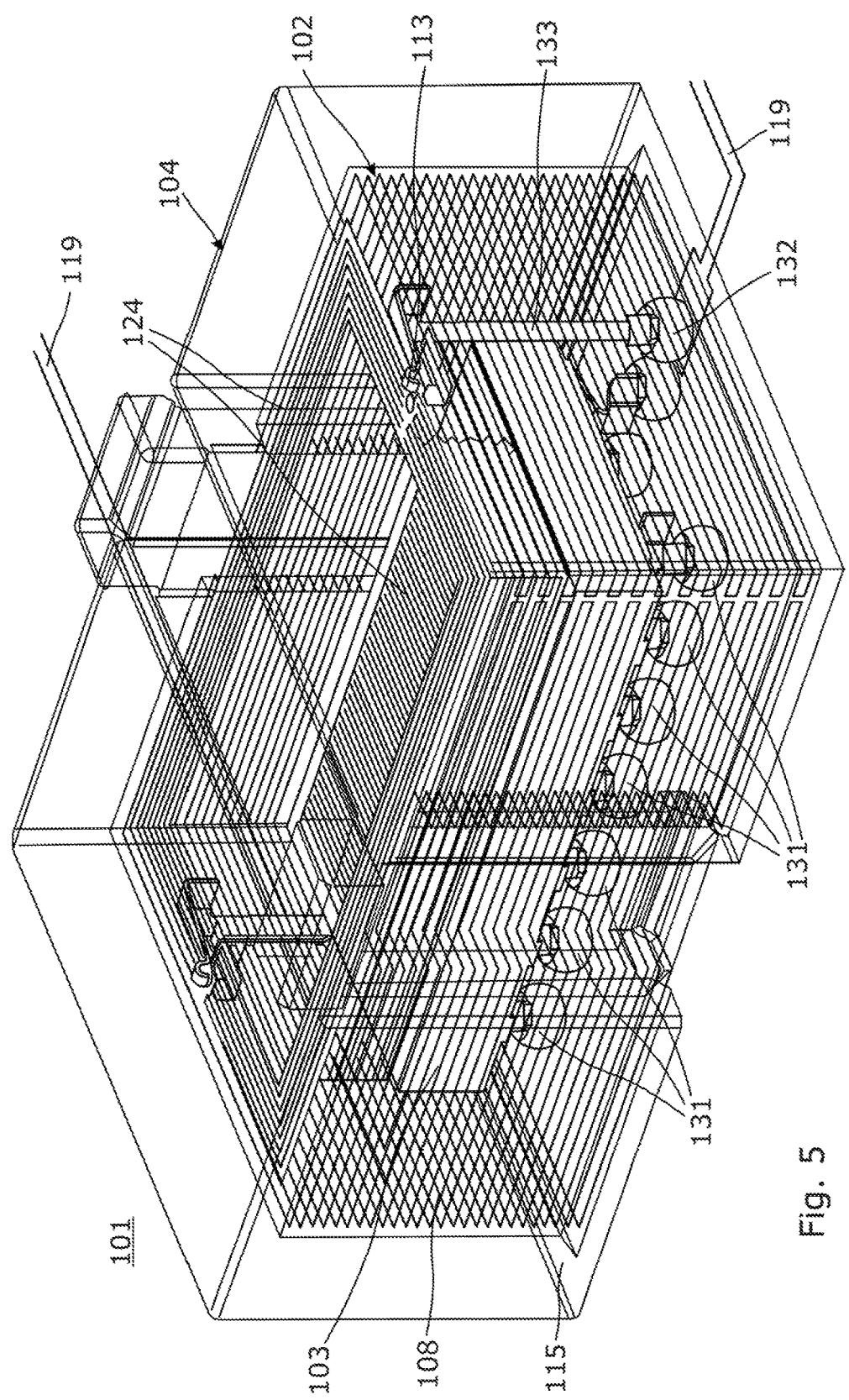
FIG. 5 is a perspective view of the example tamper detecting case of FIG. 1 with the matting lid attached to the socket and showing the interior of the tamper detecting case.

FIG. 5 is a perspective view of the example tamper detecting case 100 of FIG. 1 with the matting lid 104 attached to the socket 102 and showing the interior of the tamper detecting case 100. It should be understood that the example tamper detecting case 100 depicted in FIG. 5 may include additional components and that some of the components described herein may be removed and/or modified without departing from a scope of the example tamper detecting case 100.

In such example, the conductive traces of the 3D grid are located into the inner face of the bottom wall 109 of the socket 102, the outside surfaces of the opposite side walls 108 of the socket 102 and in the inner surface of the top wall 114 of the mating lid 104. In this way, the conductive traces of the socket 102 and the mating lid 104, by contacting through the electrical contacts 113 and the electrical contacts 126, form a continuous current path through which current from a power source (not shown in this figure) continuously flows. This current is provided to the 3D grid through the traces 119 in the PCB 101 and the traces 133 in the opposite side walls 108 that connects the traces 119 to the electrical contacts 113 via respective solder balls 132. The storage unit 103 is completely surrounded by the 3D grid of conductive traces such that any unauthorized access to the storage unit 103 through any of the surfaces of the tamper detecting case 100 will pierce or broken the 3D grid interrupting the flow of current passing through the conductive traces and triggering the erasure of the sensitive information stored in the storage unit 103.

The lower surface of the storage unit 103 comprises electrical connectors 106 that contact to electrical connectors 107 located in the inner surface of the bottom wall of the socket 102 when the storage unit 103 is fully inserted into the cavity. The electrical connectors 107 are connected to the PCB by interposition of solder balls 131 that contact pads (not shown in the figure) that in turn may be connected to components of the PCB such as processors, power units, etc., via traces. Some of these pads can be connected to traces 119 to receive the signal for erasing the storage unit 103. In addition, some of the electrical connectors 107 may be to service components housed within the cavity such as security chips, sensors, host base management controllers, etc.

The tamper detecting cases as described herein allow replacing only the storage units in case of accidental tamper response instead of having to replace an entire PCB including the storage unit, allows zeroization through damage to memory cells for non-volatile storage units that require active erasure, provides a compact component level implementation of tamper detection and tamper response and lowers to burden of securing supply chain by only covering installation of a single component which can be performed in a high value cage. It also uses less energy to monitor one single component, the storage unit, rather than monitoring a complete subsystem and allows installation of the security component at customer site.

All of the features disclosed in this specification (including any accompanying claims, abstract and drawings), and/or all of the elements of any method or process so disclosed, may be combined in any combination, except combinations where at least some of such features and/or elements are mutually exclusive.

Furthermore, relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. A tamper detecting case comprising:
a socket and a mating lid, the socket having a bottom wall, opposing side walls and an upper opening and the mating lid having a top wall, opposing side walls and a lower opening, and wherein the socket and the mating lid fit together defining an inner cavity to store at least one storage unit;
a three dimensional grid of conductive traces formed on the opposing side walls of the socket, an inner surface of the bottom wall of the socket and on an inner surface of the top wall of the mating lid, the three dimensional grid of conductive traces forming, when the socket and the mating lid are joined together, a current path;
a sensor that is to sense a flow of electrical current flowing through the current path, wherein the sensor is to generate a signal to erase the at least one storage unit when the current path is interrupted;
a host base management controller to erase the at least one storage unit in response to receiving the signal from the sensor,
wherein the at least one storage unit includes a non-volatile storage unit and the host base management controller is to generate a power signal to erase information in the non-volatile storage unit,
wherein the power signal has a power level that exceeds an integrity limit threshold value of the non-volatile storage unit.

2. The tamper detecting case of claim 1, wherein the host base management controller comprises a capacitive cell to generate the power signal.

3. The tamper detecting case of claim 1, wherein the host base management controller is to generate a zeroizing request signal to cause the non-volatile storage unit to zeroize.

4. The tamper detecting case of claim 1, wherein the sensor and the host base management controller are located in a security chip within the inner cavity.

5. The tamper detecting case of claim 1, wherein, when the socket and the mating lid are joined together, the opposing side walls of the mating lid completely cover the opposing side walls of the socket.

6. The tamper detecting case of claim 1, wherein the socket comprises at least one electrical contact and the mating lid comprises at least one complementary electrical contact, wherein when the socket and the mating lid are joined together, the at least one electrical contact electrically couples the at least one complementary electrical contact forming the current path.

7. The tamper detecting case of claim 1, comprising a first electrical contact on an upper surface of one of the opposing side walls of the socket and a second electrical contact on an upper surface of a different opposing side wall of the socket and the inner surface of the mating lid comprises a first complementary electrical contact and a second complementary electrical contact, wherein when the socket and the mating lid are joined together, the first electrical contact electrically couples the first complementary electrical contact and the second electrical contact electrically couples the second complementary electrical contact.

8. The tamper detecting case of claim 1, wherein the sensor is to detect if the three dimensional grid of conductive traces has been pierced, the sensor to generate the signal to erase the at least one storage unit when the three dimensional grid of conductive traces has been pierced.

9. The tamper detecting case of claim 1, comprising electric contacts in the socket to service the at least one storage unit.

10. The tamper detecting case of claim 1, wherein the three dimensional grid of conductive traces is to be formed on a surface of the opposing side walls of the socket selected among an inner surface of the opposing side walls, an outer surface of the opposing side walls and a combination thereof.

11. The tamper detecting case of claim 1, wherein the three dimensional grid of conductive traces is to be formed using a technique selected among a group comprising a Molded Interconnect Device (MID) technique, a Laser Direct Structuring (LDS) technique and a combination thereof.

12. The tamper detecting case of claim 1, wherein the at least one storage unit contains information selected from a group including encryption keys, sensitive data, secrete data and a combination thereof.

13. A tamper detecting case comprising:
a socket and a mating lid, the socket having a bottom wall, opposing side walls and an upper opening and the mating lid having a top wall, opposing side walls and a lower opening, and wherein the socket and the mating lid fit together defining an inner cavity to store at least one storage unit;
a three dimensional grid of conductive traces formed on the opposing side walls of the socket, an inner surface of the bottom wall of the socket and on an inner surface of the top wall of the mating lid, the three dimensional grid of conductive traces forming, when the socket and the mating lid are joined together, a current path;
a sensor that is to sense a flow of electrical current flowing through the current path, wherein the sensor is to generate a signal to erase the at least one storage unit when the current path is interrupted;
a host base management controller to erase the at least one storage unit in response to receiving the signal from the sensor,
wherein the at least one storage unit includes a non-volatile storage unit and the host base management controller is to generate a power signal to erase information in the non-volatile storage unit,
wherein the host base management controller comprises a capacitive cell to generate the power signal.

14. The tamper detecting case of claim 13, wherein the at least one storage unit is a volatile storage unit and the host base management controller comprises a switch, wherein the switch, in response to receiving the signal from the sensor, is to open interrupting a power supply from a power unit to the volatile storage unit to erase the volatile storage unit.

15. The tamper detecting case of claim 14, wherein the sensor and the switch are located in a security chip within the inner cavity.

16. The tamper detecting case of claim 14, comprising a capacitive cell to power the volatile storage unit in response to detecting a power loss.

17. A tamper detecting case comprising:
a socket and a mating lid, the socket having a bottom wall, opposing side walls and an upper opening and the mating lid having a top wall, opposing side walls and a lower opening, and wherein the socket and the mating lid fit together defining an inner cavity to store at least one storage unit;
a three dimensional grid of conductive traces formed on the opposing side walls of the socket, an inner surface of the bottom wall of the socket and on an inner surface of the top wall of the mating lid, the three dimensional grid of conductive traces forming, when the socket and the mating lid are joined together, a current path; and
a sensor that is to sense a flow of electrical current flowing through the current path, wherein the sensor is to generate a signal to erase the at least one storage unit when the current path is interrupted,
wherein the three dimensional grid of conductive traces is to be formed using a technique selected among a group comprising a Molded Interconnect Device (MID) technique, a Laser Direct Structuring (LDS) technique and a combination thereof.

* * * * *